(12) United States Patent
Sakamoto

(10) Patent No.: US 8,009,318 B2
(45) Date of Patent: Aug. 30, 2011

(54) PREPARING FORM DATA AND PAGE DATA FOR PRINTING, IMAGE PROCESSING DEVICE, IMAGE PROCESSING METHOD, AND COMPUTER READABLE RECORDING MEDIUM STORED WITH IMAGE PROCESSING PROGRAM

(75) Inventor: Shigeru Sakamoto, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 942 days.

(21) Appl. No.: 11/163,633

(22) Filed: Oct. 25, 2005

(65) Prior Publication Data
US 2006/0187488 A1 Aug. 24, 2006

(30) Foreign Application Priority Data
Feb. 23, 2005 (JP) .................. 2005-047152

(51) Int. Cl.
G06F 15/00 (2006.01)
H04N 1/00 (2006.01)
H04N 1/387 (2006.01)
H04N 1/46 (2006.01)

(52) U.S. Cl. ....... 358/1.18; 358/403; 358/452; 358/453; 358/540

(58) Field of Classification Search .................. 358/1.18, 358/1.15, 1.2, 1.16, 403, 452, 453, 540; 715/911; 507/707, 527, 205, 511; 345/352
See application file for complete search history.

(56) References Cited

U.S. PATENT DOCUMENTS

| 5,104,245 A * | 4/1992 | Oguri et al. ..................... 400/68 |
| 6,919,967 B1 | 7/2005 | Pentecost et al. |
| 2004/0136033 A1 * | 7/2004 | Glaspy et al. ................ 358/1.18 |
| 2005/0044494 A1 * | 2/2005 | Barnes et al. ................. 715/531 |
| 2005/0094191 A1 * | 5/2005 | Vondran et al. .............. 358/1.15 |

FOREIGN PATENT DOCUMENTS

| JP | 2001-199105 A | 7/2001 |
| JP | 2003-110831 | 4/2003 |

OTHER PUBLICATIONS

Official Action (Notification of Reason for Refusal) issued by the Japanese Patent Office in priority Japanese Patent Application No. 2005-047152; and English translation thereof.

* cited by examiner

*Primary Examiner* — Benny Q Tieu
*Assistant Examiner* — Ngon Nguyen
(74) *Attorney, Agent, or Firm* — Buchanan Ingersoll & Rooney PC

(57) ABSTRACT

A print server which functions as an image processing device extracts the reusable data of each object to be used on multiple pages within the file and prepares the form data by synthesizing the extracted reusable data. The print server prepares page data to be used for printing by synthesizing the prepared form data and the data of each object that is not contained in the form data.

21 Claims, 19 Drawing Sheets

<Reusable object>
    <Object>Reuse Rectangle.pdf</object><size>400,200</size>
    <Object>Reuse ConcertTicket.pdf</object><size>300,100</size>
    <Object>Reuse Ribbon.pdf</object><size>200,200</size>
    <Object>Reuse Smile.pdf</object><size>100,100</size>
    <Object>Reuse Sun.pdf</object><size>100,100</size>
    <Object>Reuse Heart.pdf</object><size>100,100</size>
</Reusable object>
<page 1>
    <Object>Reuse Rectangle.pdf</object><position>0,0</position>
    <Object>Reuse ConcertTicket.pdf</object><position>10,10</position>
    <Object>Reuse Ribbon.pdf</object><position>10,100</position>
    <Object>Non-reuse 0001.pdf</object><position>20,110</position><size>100,100</size>
    <Object>Reuse Smile.pdf</object><position>300,30</position>
    <Object>Reuse Rectangle.pdf</object><position>0,300</position>
    <Object>Reuse ConcertTicket.pdf</object><position>10,310</position>
    <Object>Reuse Ribbon.pdf</object><position>10,400</position>
    <Object>Non-reuse 0002.pdf</object><position>20,410</position><size>100,100</size>
    <Object>Reuse Heart.pdf</object><position>300,330</position>
    <Object>Reuse Rectangle.pdf</object><position>0,600</position>
    <Object>Reuse ConcertTicket.pdf</object><position>10,610</position>
    <Object>Reuse Ribbon.pdf</object><position>10,700</position>
    <Object>Non-reuse 0003.pdf</object><position>20,710</position><size>100,100</size>
    <Object>Reuse Sun.pdf</object><position>300,630</position>
</page 1>
<page 2>...omitted...</page 2>
<page 3>...omitted...</page 3>
~~~omitted~~~~~

FIG.11

~~~omitted~~~~~

<page 1000>

<Object>Reuse Rectangle.pdf</object><position>0,0</position>

<Object>Reuse ConcertTicket.pdf</object><position>10,10</position>

<Object>Reuse Ribbon.pdf</object><position>10,100</position>

<Object>Non-reuse 2998.pdf</object><position>20,110</position><size>100,100</size>

<Object>Non-reuse Smile.pdf</object><position>300,30</position>

<Object>Reuse Rectangle.pdf</object><position>0,300</position>

<Object>Reuse ConcertTicket.pdf</object><position>10,310</position>

<Object>Reuse Ribbon.pdf</object><position>10,400</position>

<Object>Non-reuse 2999.pdf</object><position>20,410</position><size>100,100</size>

<Object>Reuse Heart.pdf</object><position>300,330</position>

<Object>Reuse Rectangle.pdf</object><position>0,600</position>

<Object>Reuse ConcertTicket.pdf</object><position>10,610</position>

<Object>Reuse Ribbon.pdf</object><position>10,700</position>

<Object>Non-reuse 3000.pdf</object><position>20,710</position><size>100,100</size>

<Object>Reuse Sun.pdf</object><position>300,630</position>

</page 1000>

101

| Object name | Position | Size | Reuse count |
|---|---|---|---|
| Reuse Rectangle.pdf | 0,0 | 400,200 | 1000 |
| Reuse ConcertTicket.pdf | 10,10 | 300,100 | 1000 |
| Reuse Ribbon.pdf | 10,100 | 200,200 | 1000 |
| Reuse Smile.pdf | 300,30 | 100,100 | 66 |
| Reuse Rectangle.pdf | 0,300 | 400,200 | 1000 |
| Reuse ConcertTicket.pdf | 10,310 | 300,100 | 1000 |
| Reuse Ribbon.pdf | 10,400 | 200,200 | 1000 |
| Reuse Heart.pdf | 300,330 | 100,100 | 45 |
| Reuse Rectangle.pdf | 0,600 | 400,200 | 1000 |
| Reuse ConcertTicket.pdf | 10,610 | 300,100 | 1000 |
| Reuse Ribbon.pdf | 10,700 | 200,200 | 1000 |
| Reuse Sun.pdf | 300,630 | 100,100 | 93 |

```
<Form>
  <Object>Reuse Rectangle.pdf</object><position>0,0</position><size>400,200</size>
  <Object>Reuse ConcertTicket.pdf</object><position>10,10</position><size>300,100</size>
  <Object>Reuse Ribbon.pdf</object><position>10,100</position><size>200,200</size>
  <Object>Reuse Rectangle.pdf</object><position>0,300</position><size>400,200</size>
  <Object>Reuse ConcertTicket.pdf</object><position>10,310</position><size>300,100</size>
  <Object>Reuse Ribbon.pdf</object><position>10,400</position><size>200,200</size>
  <Object>Reuse Rectangle.pdf</object><position>0,600</position><size>400,200</size>
  <Object>Reuse ConcertTicket.pdf</object><position>10,610</position><size>300,100</size>
  <Object>Reuse Ribbon.pdf</object><position>10,700</position><size>200,200</size>
</Form>
```

0001 0002 0003 0004 ······
2998 2999 3000

FIG. 17
Page 1
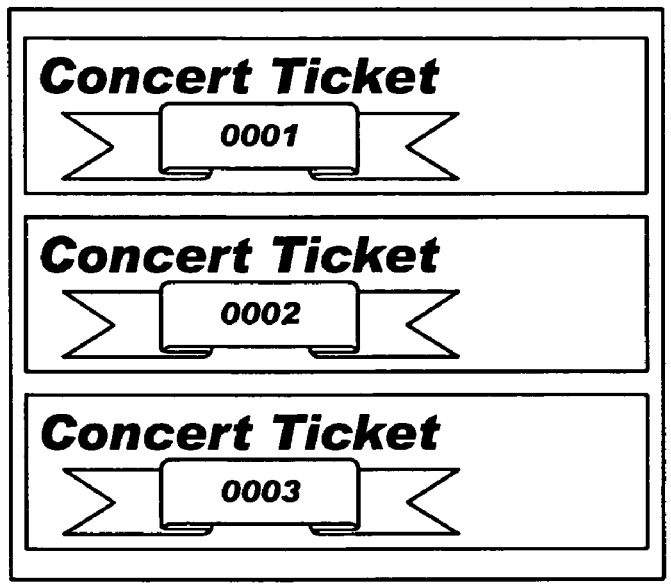
⋮
Page 1000
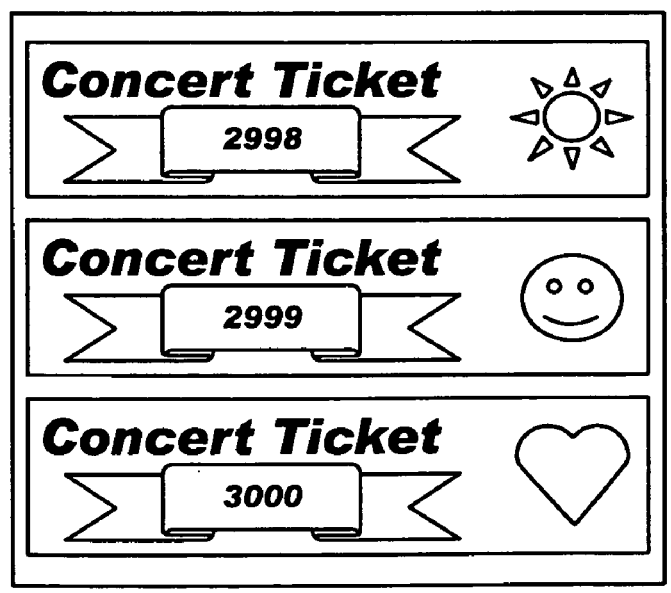

| | Page 1 | Page 2 | Page 3 | Page 4 | ...... | Page 100 | Reuse count |
|---|---|---|---|---|---|---|---|
| Reuse 1 | ○ | × | ○ | × | ...... | × | 4 |
| Reuse 2 | ○ | × | ○ | × | ...... | × | 50 |
| Reuse 3 | ○ | × | ○ | × | ...... | × | 15 |
| Reuse 4 | ○ | × | ○ | × | ...... | × | 50 |
| Reuse 5 | × | ○ | × | ○ | ...... | ○ | 30 |
| Reuse 6 | × | ○ | × | ○ | ...... | ○ | 11 |
| Reuse 7 | × | ○ | × | ○ | ...... | ○ | 8 |
| Reuse 8 | × | ○ | × | ○ | ...... | ○ | 50 |
| Reuse 9 | × | × | × | × | ...... | × | 10 |
| Reuse 10 | × | ○ | × | × | ...... | × | 5 |
| Reuse 11 | × | × | × | ○ | ...... | × | 9 |
| Reuse 12 | × | × | ○ | × | ...... | × | 3 |
| Reuse 13 | ○ | × | × | × | ...... | × | 1 |
| Reuse 14 | × | × | × | × | ...... | × | 4 |
| ...... | ...... | ...... | ...... | ...... | ...... | ...... | ...... |
| Reuse 66 | × | × | × | × | ...... | ○ | 30 |

|  | Page 1 | Page 2 | Page 3 | Page 4 | ······ | Page 100 | Reuse count |
|---|---|---|---|---|---|---|---|
| Reuse 1 | 4 | 0 | 4 | 0 | ······ | 0 | 4 |
| Reuse 2 | 50 | 0 | 50 | 0 | ······ | 0 | 50 |
| Reuse 3 | 15 | 0 | 15 | 0 | ······ | 0 | 15 |
| Reuse 4 | 50 | 0 | 50 | 0 | ······ | 0 | 50 |
| Reuse 5 | 0 | 50 | 0 | 50 | ······ | 50 | 50 |
| Reuse 6 | 0 | 11 | 00 | 11 | ······ | 11 | 11 |
| Reuse 7 | 0 | 8 | 0 | 8 | ······ | 8 | 8 |
| Reuse 8 | 0 | 50 | 0 | 50 | ······ | 50 | 50 |
| Reuse 9 | 0 | 0 | 0 | 0 | ······ | 0 | 10 |
| Reuse 10 | 0 | 5 | 0 | 0 | ······ | 0 | 5 |
| Reuse 11 | 0 | 0 | 0 | 9 | ······ | 0 | 9 |
| Reuse 12 | 0 | 0 | 3 | 0 | ······ | 0 | 3 |
| Reuse 13 | 1 | 0 | 0 | 0 | ······ | 0 | 1 |
| Reuse 14 | 0 | 0 | 0 | 0 | ······ | 0 | 4 |
| ······ | ······ | ······ | ······ | ······ | ······ | ······ | ······ |
| Reuse 66 | 0 | 0 | 0 | 0 | ······ | 30 | 30 |

|  | Page 1 | Page 2 | Page 3 | Page 4 | ...... | Page 100 | Reuse count |
|---|---|---|---|---|---|---|---|
| Reuse 2 | 50 | 0 | 50 | 0 | ...... | 0 | 50 |
| Reuse 4 | 50 | 0 | 50 | 0 | ...... | 0 | 50 |
| Reuse 5 | 0 | 50 | 0 | 50 | ...... | 50 | 50 |
| Reuse 8 | 0 | 50 | 0 | 50 | ...... | 50 | 50 |
| Reuse 66 | 0 | 0 | 0 | 0 | ...... | 30 | 30 |
| Reuse 3 | 15 | 0 | 15 | 0 | ...... | 0 | 15 |
| Reuse 6 | 0 | 11 | 0 | 11 | ...... | 11 | 11 |
| Reuse 9 | 0 | 0 | 0 | 0 | ...... | 0 | 10 |
| Reuse 11 | 0 | 0 | 0 | 9 | ...... | 0 | 9 |
| Reuse 7 | 0 | 8 | 0 | 8 | ...... | 8 | 8 |
| Reuse 10 | 0 | 5 | 0 | 0 | ...... | 0 | 5 |
| Reuse 1 | 4 | 0 | 4 | 0 | ...... | 0 | 4 |
| Reuse 14 | 0 | 0 | 0 | 0 | ...... | 0 | 4 |
| Reuse 12 | 0 | 0 | 3 | 0 | ...... | 0 | 3 |
| Reuse 13 | 1 | 0 | 0 | 0 | ...... | 0 | 1 |

|  | Group A | | Group B | | |
| --- | --- | --- | --- | --- | --- |
|  | Page 1 | Page 3 | Page 2 | Page 4 | Page 100 |
| Reuse 2 | 50 | 50 | 0 | 0 | 0 |
| Reuse 4 | 50 | 50 | 0 | 0 | 0 |
| Reuse 5 | 0 | 0 | 50 | 50 | 50 |
| Reuse 8 | 0 | 0 | 50 | 50 | 50 |
| Reuse 66 | 0 | 0 | 0 | 0 | 30 |
| Reuse 3 | 15 | 15 | 0 | 0 | 0 |
| Reuse 6 | 0 | 0 | 11 | 11 | 11 |
| Reuse 9 | 0 | 0 | 0 | 0 | 0 |
| Reuse 11 | 0 | 0 | 0 | 9 | 0 |
| Reuse 7 | 0 | 0 | 8 | 8 | 8 |
| Reuse 10 | 0 | 0 | 5 | 0 | 0 |
| Reuse 1 | 4 | 4 | 0 | 0 | 0 |
| Reuse 14 | 0 | 0 | 0 | 0 | 0 |
| Reuse 12 | 0 | 3 | 0 | 0 | 0 |
| Reuse 13 | 1 | 0 | 0 | 0 | 0 |

PREPARING FORM DATA AND PAGE DATA FOR PRINTING, IMAGE PROCESSING DEVICE, IMAGE PROCESSING METHOD, AND COMPUTER READABLE RECORDING MEDIUM STORED WITH IMAGE PROCESSING PROGRAM

This application is based on Japanese Patent Application No. 2005-047152 filed on Feb. 23, 2005, the contents of which are hereby incorporated by reference.

BACKGROUND OF THE INVENTION

1. Field of the Invention

The invention relates to an image processing device, an image processing method, and a computer readable recording medium stored with an image processing program. The invention relates particularly to an image processing device, an image processing method, and a computer readable recording medium stored with an image processing program for processing a file containing page defining objects, at least one of which is used in a plurality of locations of the file.

2. Description of the Related Art

In recent years, the need for the variable printing has been increasing for mass printing represented by direct mail from the standpoint of CRM (Customer Relationship Management). Variable printing here means the printing method in which the output contents of each page can be partially changed depending on the needs.

In the variable printing, it takes additional time for transferring data as it is necessary to transmit the same master data repeatedly if the master data and the replacement data are transmitted to a printer after synthesizing them in a personal computer (PC).

In order to solve this problem, a technology is proposed (Unexamined Publication No. JP-A-2003-110831) for transferring the master data and the replacement part data to the printer from the PC in advance, and transferring only the necessary additional data to the printer from the PC when they are required for processing the specific pages. According to this technology, the amount of data transfer is reduced so that the data transfer time can be reduced as well.

However, although the abovementioned technology makes it possible to avoid the repetitive transfer of the same data, it still requires synthesizing the master data and the replacement data for each page. In other words, there is a problem that it takes a lot of time to synthesize data preventing further improvement of the performance of a printing process, as it is necessary to conduct a synthesis for each page while the same data is used for multiple pages.

OBJECTS AND SUMMARY

It is an object of the present invention to provide an image processing device, an image processing method, and a computer readable recording medium stored with an image processing program, which are all improved to solve the abovementioned problems.

It is another object of the present invention to provide an image processing device, an image processing method, and a computer readable recording medium stored with an image processing program for improving the performance of a printing process by reducing the time necessary for data synthesis required for preparing page data in printing a file containing page defining objects, at least one of which is used in a plurality of locations of the file.

According to an embodiment of the invention, there is provided an image processing device for processing a file containing objects that define a part or all of contents of a specific page, at least one of which objects being used in a plurality of locations of the file, said device comprising: an extraction unit for extracting data per each object that is used commonly on a plurality of pages in the file; a form data preparation unit for preparing form data by synthesizing the extracted data; and a page data preparation unit for preparing page data to be used for printing by synthesizing the prepared form data and the data per each object that is not contained in the form data.

According to the present invention, it is possible to reduce the number of synthesizing processes which have hitherto been repeated on each page even in case of common data which is used on multiple pages. This makes it possible to improve the performance of a printing process as it can reduce the time necessary for data synthesis required for page data preparation.

According to another embodiment of the invention, there is provided an image processing method for processing a file containing objects that define a part or all of contents of a specific page, at least one of which objects being used in a plurality of locations of the file, said method comprising the steps of: 1) extracting data for each object that is used commonly on a plurality of pages in the file; 2) preparing form data by synthesizing the extracted data; and 3) preparing page data to be used for printing by synthesizing the prepared form data and the data of each object that is not contained in the form data.

According to a further embodiment of the invention, there is provided a computer readable recording medium stored with an image processing program for processing a file containing objects that define a part or all of contents of a specific page, at least one of which objects being used in a plurality of locations of the file, said program causing a computer to execute a process comprising the steps of: 1) extracting data for each object that is used commonly on a plurality of pages in the file; 2) preparing form data by synthesizing the extracted data; and 3) preparing page data to be used for printing by synthesizing the prepared form data and the data of each object that is not contained in the form data.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 10 shows an example of a layout file.

FIG. 11 shows the example of the layout file continuing from FIG. 10.

FIG. 14 shows an example of form information.

FIG. 17 shows an example of page data outputs.

FIG. 19 shows an example of a usage management list for reusable objects.

FIG. 20 shows an example of the usage management list after the items have been replaced.

FIG. 21 shows an example of the usage management list after sorting.

FIG. 22 shows an example of a group list.

DETAILED DESCRIPTION OF PREFERRED EMBODIMENTS

The embodiments of this invention will be described below with reference to the accompanying drawings.

Figure 1:
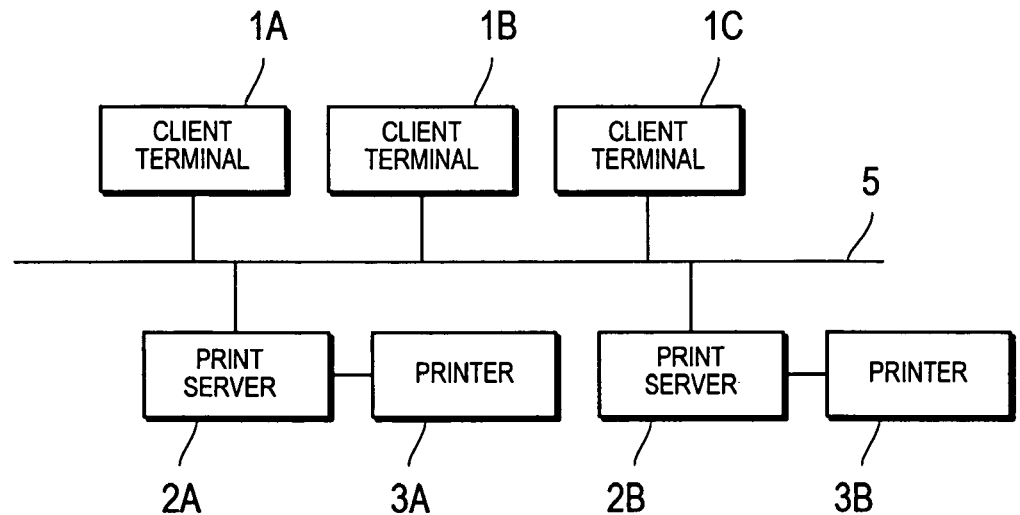
FIG. 1 is an overall constitutional diagram of an image processing system according to a first embodiment of the present invention.

FIG. 1 is an overall constitutional diagram of an image processing system according to a first embodiment of the present invention.

The image processing system is equipped with client terminals 1A, 1B, and 1C; print servers 2A and 2B; and printers 3A and 3B.

The client terminals 1A, 1B, and 1C and the print servers 2A and 2B are interconnected with each other via a network 5 to be communicable with each other. The network 5 can be a LAN connecting computers and network equipment according to standards such as Ethernet®, Token Ring, and FDDI, or a WAN that consists of several LANs connected by a dedicated line. The print servers 2A and 2B and the printers 3A and 3B are connected respectively via dedicated interface buses such as IEEE 1394 serial buses. However, the print server and the printer can be connected via the network 5 as well. The types and the number of equipment to be connected to the network 5 are not limited to those shown in FIG. 1.

Next, constitution of each device mentioned above will be described below, but the description of a function common to multiple devices will be made only once when it first appears and will not be repeated afterwards in order to avoid duplicate descriptions.

Figure 2:
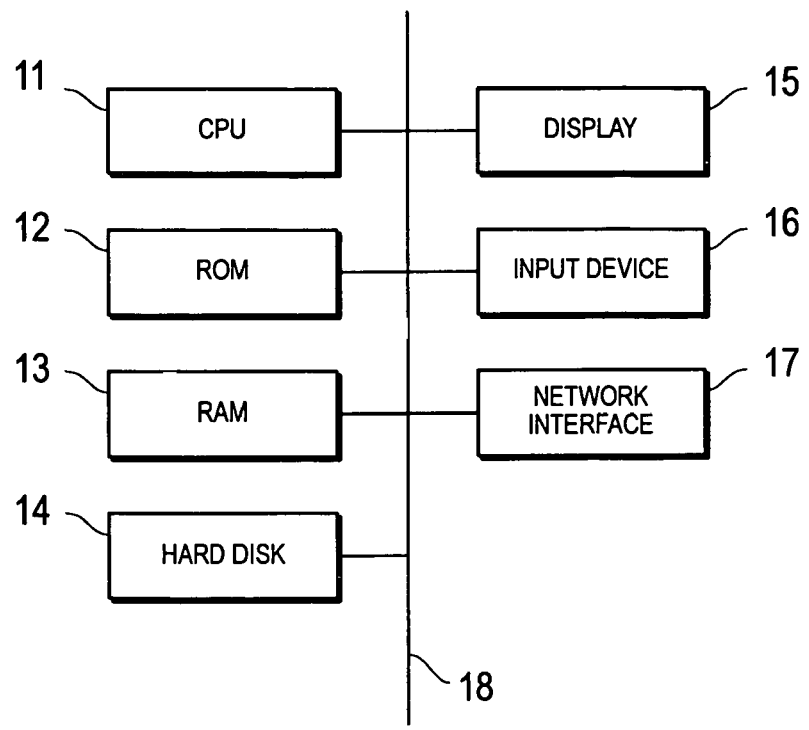
FIG. 2 is a block diagram showing the schematic constitution of a client terminal.

FIG. 2 is a block diagram showing the schematic constitution of the client terminals 1A, 1B, and 1C. The client terminals 1A, 1B, and 1C are typically PCs. Since the client terminals 1A, 1B, and 1C have identical constitutions with each other, the client terminal 1A shall be used to represent all of them in the following description.

The client terminal 1A contains a CPU 11, a ROM 12, a RAM 13, a hard disk 14, a display 15, an input device 16 and a network interface 17, all of which are interconnected by a bus 18 for exchanging signals.

The CPU 11 controls various parts indicated above and executes various arithmetic processes according to a program. The ROM 12 stores various programs and data in advance. The RAM 13 stores programs and data temporarily as a working area. The hard disk 14 stores various programs including an operating system and data.

Display 15 is typically a liquid crystal display and displays various kinds of information. The input device 16 consists of a pointing device such as a mouse, a keyboard, and others, and is used for making various kinds of inputs. The network interface 17 is typically a LAN card and is used for communicating with external equipment via the network 5.

The hard disk 14 has application software installed for preparing a print job in order to execute a variable printing.

The client terminal 1A prepares a print job including objects that define a part or all of the contents of a specific page and transmits it to the print server. The client terminal 1A is capable of monitoring the processing conditions at the print servers 2A and 2B and displaying the page data prepared on the print servers 2A and 2B.

The print job in this embodiment is preferably a file of a format that follows PPML (Personalized Print Markup Language). The print job here is a file consisting of a layout file having the layout information of the objects of each page and a data file having a group of data per each object combined into one. The data file contains reusable objects and non-reusable objects. A reusable object is an object that can be used repetitively on one page or on multiple pages, while a non-reusable object is an object that can be used only once. The layout file contains information by each object type indicating whether the particular object is a reusable object or a non-reusable object.

Figure 3:
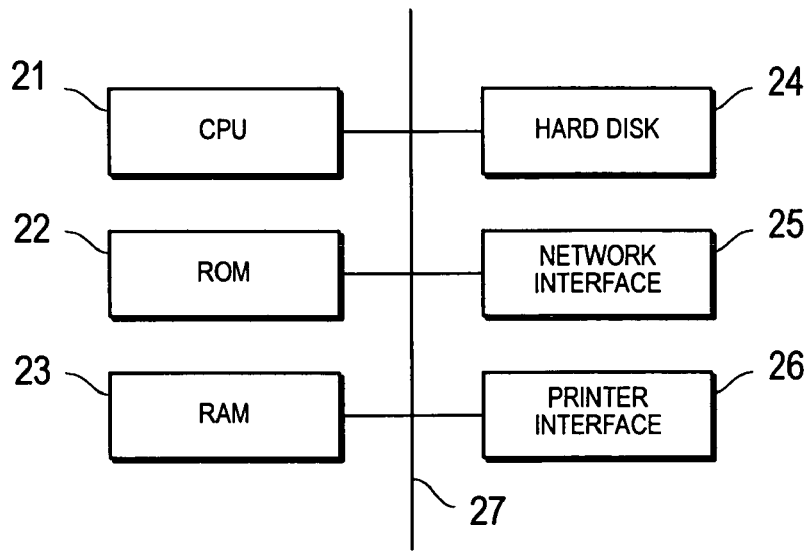
FIG. 3 is a block diagram showing the schematic constitution of a print server.

FIG. 3 is a block diagram showing the schematic constitution of the print servers 2A and 2B. Since the print servers 2A and 2B have identical constitutions with each other, the print server 2A shall be used to represent both in the following description.

The print server 2A contains a CPU 21, a ROM 22, a RAM 23, a hard disk 24, a network interface 25, and a printer interface 26, all of which are interconnected via a bus 27 for exchanging signals.

The printer interface 26 is an interface for communicating with the printer 3A.

Figure 4:
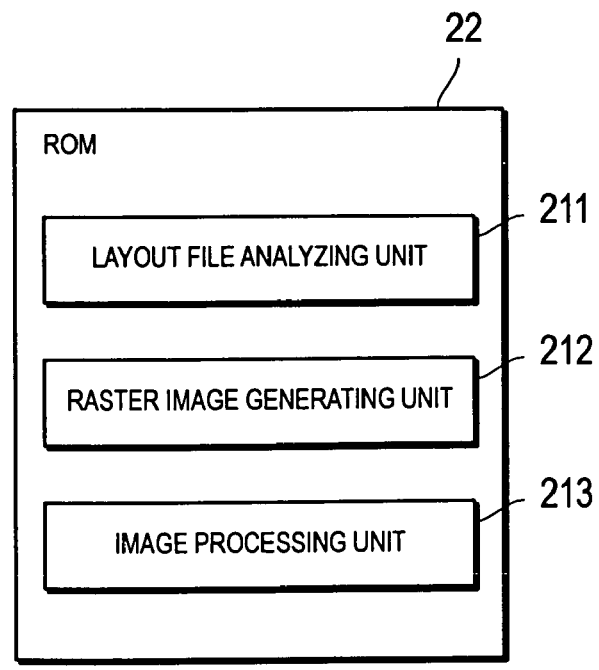
FIG. 4 is a diagram for describing a layout file analyzing unit, a raster image generating unit, and an image processing unit.

As shown in FIG. 4, the ROM 22 has areas assigned respectively for programs corresponding to a layout file analyzing unit 211, a raster image generating unit 212 and an image processing unit 213. The layout file analyzing unit 211 analyzes a layout file contained in the received print job. The raster image generating unit 212 executes RIP (Raster Image Processing) in order to convert the received print job into image data in a bitmap format. In other words, the raster image generating unit 212 converts the object of the data file contained in the received print job into image data of the bit map format that is used by the printer 3A for printing. The image processing unit 213 prepares form data by synthesizing the reusable data which is the image data generated from the reusable object by RIP. The image processing unit 213 prepares page data to be used for printing by using the form data. The functions of the layout file analyzing unit 211, the raster image generating unit 212, and the image processing unit 213 are implemented as the CPU 21 executes their respective programs.

Figure 5:
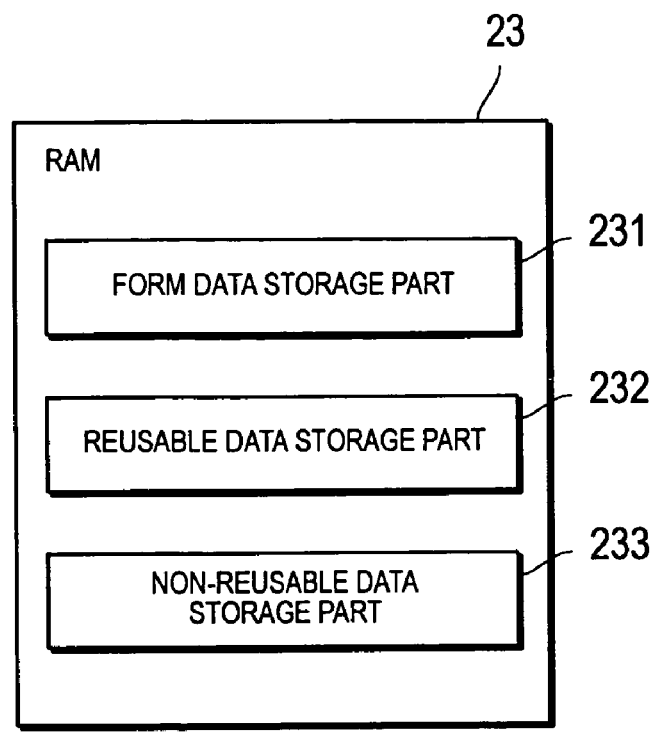
FIG. 5 is a diagram for describing a form data storage part, a reusable data storage part, and a non-reusable data storage part.
Figure 6:
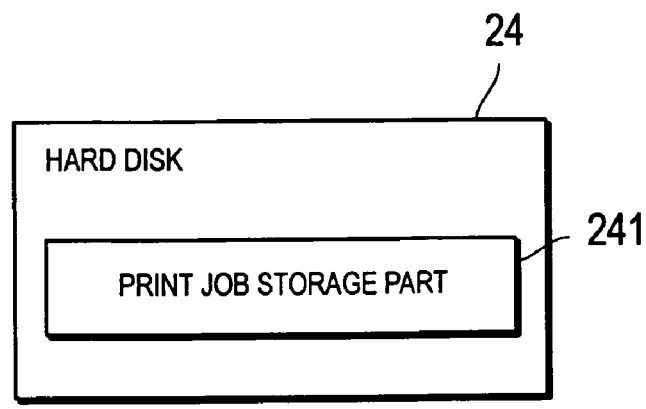
FIG. 6 is a diagram for describing a print job storage part.

As shown in FIG. 5, the RAM 23 has areas assigned respectively for a form data storage part 231, a reusable data storage part 232, and a non-reusable data storage part 233. The form data storage part 231 stores generated form data. The reusable data storage part 232 stores the generated reusable data. The non-reusable data storage part 233 stores non-reusable data, which is image data generated from the non-reusable object by RIP. As shown in FIG. 6, the hard disk 24 has an area for a print job storage part 241. The print job storage part 241 stores the received print job.

The print server 2A executes RIP based on the received print job, prepares page data using the form data processed by RIP, and transmits the prepared page data to the printer 3A.

Figure 7:
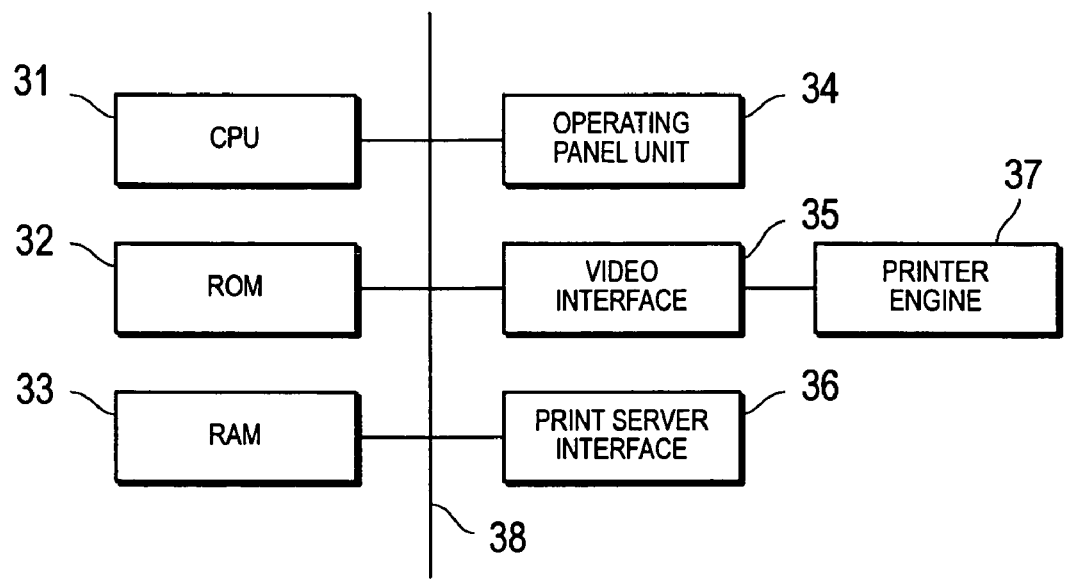
FIG. 7 is a block diagram showing the schematic constitution of a printer.

FIG. 7 is a block diagram showing the schematic constitution of the printer 3A. Since the printers 3A and 3B have identical constitutions, the printer 3A shall be used to represent both in the following description.

The printer 3A has a CPU 31, a ROM 32, a RAM 33, an operating panel unit 34, a video interface 35, and a print server interface 36, all of which are interconnected with each other via a bus 38 for exchanging signals. The printer 3A has a printer engine 37 connected to the video interface 35.

The operating panel unit 34 is used for displaying various kinds of information and for entering various instructions. The video interface 35 is an interface for communicating with the printer engine 37. The print server interface 36 is an interface for communicating with the print server 2A. The printer engine 37 prints the page data on a recording medium such as paper using a known imaging process such as the electronic photographing process including such processes as electrical charging, exposure, developing, transferring and fixing.

The client terminals 1A, 1B, and 1C; the print servers 2A and 2B; and the printers 3A and 3B can contain components other than those components mentioned above, or do not have to contain all of the components mentioned above.

Figure 8:
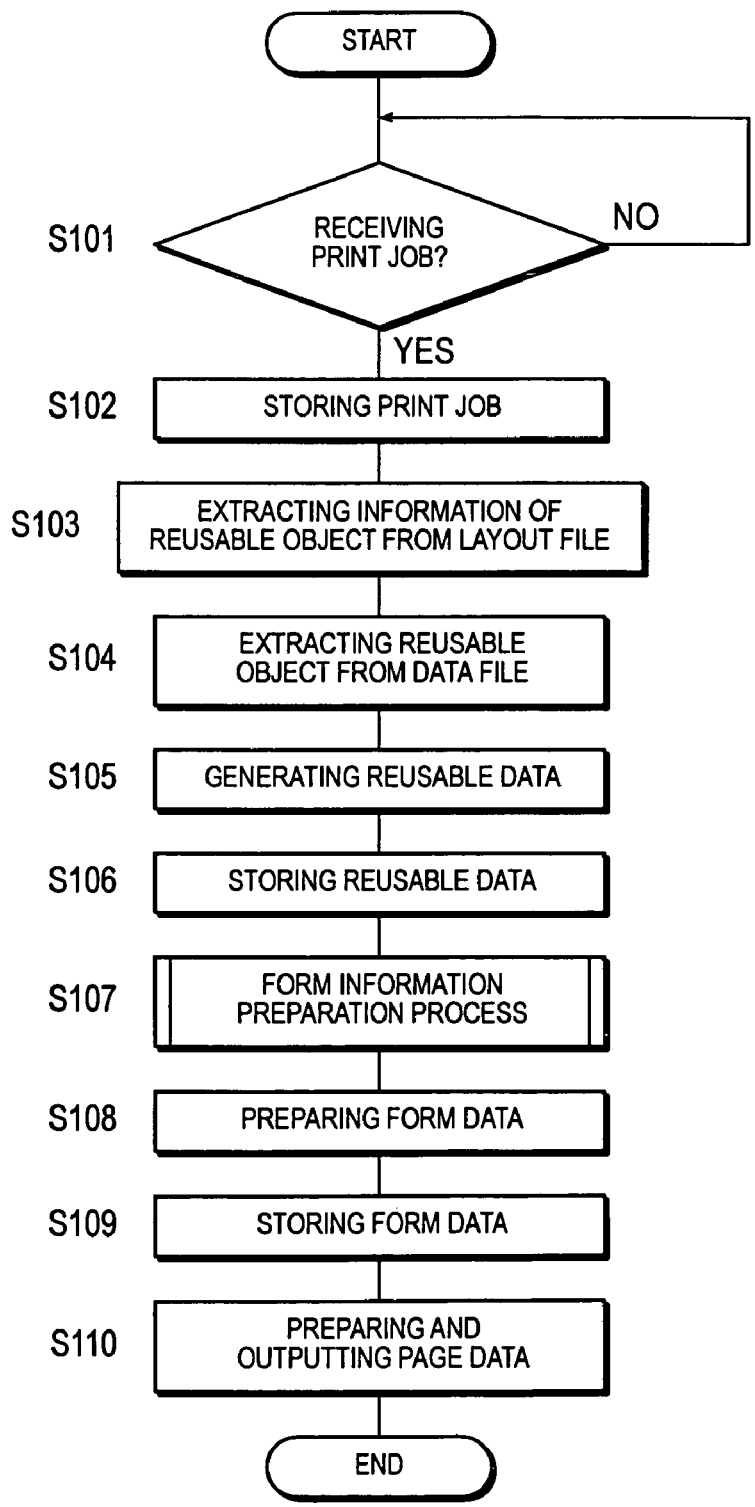
FIG. 8 is a flowchart showing the sequence of the process on the print server.
Figure 9:
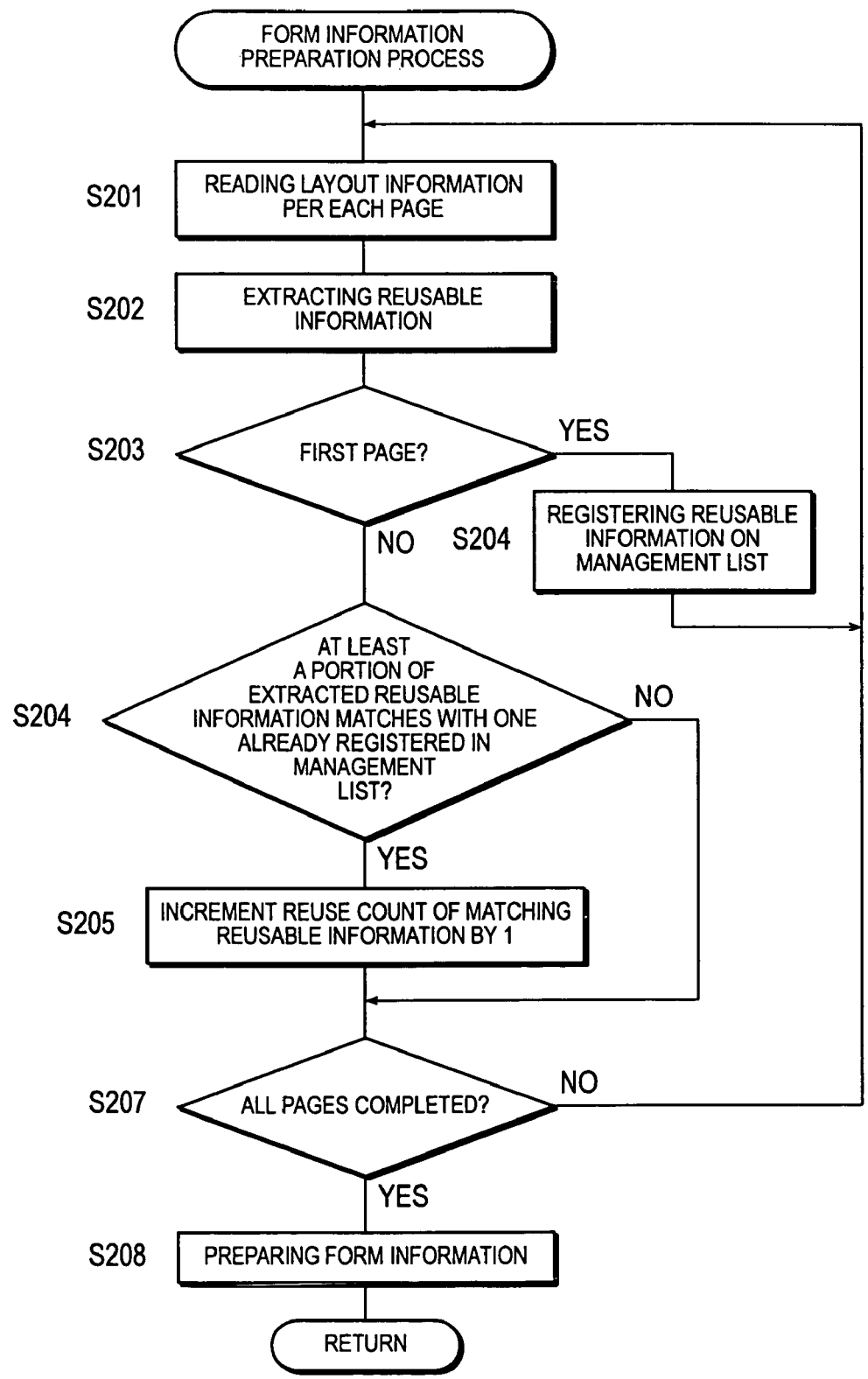
FIG. 9 is a flowchart showing the sequence of the preparation process for form information.

Next, the process in the print server 2A will be described below referring to FIG. 8 through FIG. 17. The algorithm shown in the flowcharts of FIG. 8 and FIG. 9 is stored as a program in a storage unit such as the ROM 22 of the print server 2A and executed by the CPU 21.

First, the user prepares a print job for executing variable printing using the application software program installed in the client terminal 1A.

The print server 2A stands by until a print job is received from the client terminal 1A (S101: No).

When the print job is received (S101: Yes), the print server 2A stores the received print job in the print job storage part 241 of the hard disk 24 (S102). However, the received print job can be stored in the remote database server or a common file system.

As mentioned before, a print job contains a layout file and a data file. A data file used here can be a file described in PDL (Page Description Language) such as PS (PostScript®), PDF (Portable Document Format), and EPS (Encapsulated PostScript). However, the other type of data such as RIP-processed data and vector data can be used as the data file.

Next, the layout file contained in the print job is analyzed by the layout file analyzing unit 211 and information about reusable objects is extracted from the particular layout file (S103).

FIG. 10 shows an example of a layout file, and FIG. 11 shows the example of the layout file continuing from FIG. 10.

The layout file contains information about the names, types, sizes (sizes of circumscribed rectangles), and locations (coordinates within a page) of the objects. The sizes and locations of the objects are expressed by numbers of pixels. It shows that the example print job indicated in FIG. 10 and FIG. 11 consists of 1000 pages. For example, the first page of the page data shows that an object with a name of "Reusable Rectangle.pdf" having a size of (400×200) is synthesized at a location (0, 0), and an object with a name of "Non-reusable 0001.pdf" having a size of (100×100) is synthesized at a location (20, 110). Although XML-format data is used as a layout file in this example, the data format is not to be limited to XML, but data of other formats can be used.

Next, reusable objects are extracted from the data file based on the information of reusable objects extracted from the layout file (S104).

The raster image generating unit 212 then applies the RIP and color matching processes to the extracted reusable objects in order to generate reusable data converted into image data of CMYK (S105).

Figures 12, 13:
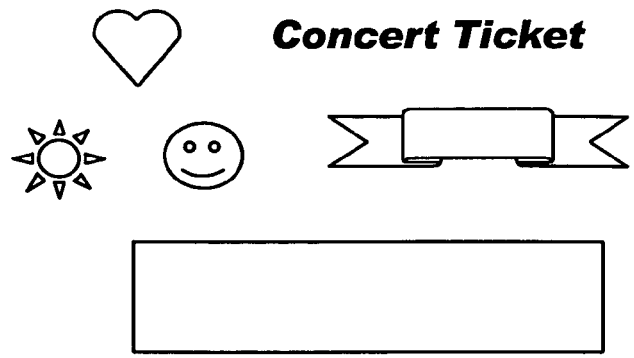
FIG. 12 shows an example of reusable data output.
FIG. 13 shows an example of a management list.

FIG. 12 shows an example of reusable data output. The generated reusable data is stored in the reusable data storage part 232 of the RAM 23 (S106). The reusable data is erased in this embodiment after completing the printing of all pages.

In the step S107, the layout file is analyzed by the layout file analyzing unit 211 in order to prepare the form information. The form information is intended to show objects required for preparing form data to be obtained by synthesizing the reusable data.

Next, let us describe the preparation process for form information with reference to FIG. 9.

First, one page portion of the layout information is read from the layout file (refer to FIG. 10 and FIG. 11) (S201).

Next, the one page portion of the layout information thus read out is analyzed to extract the information concerning the reusable objects (hereinafter called "reusable information") (S202). The extracted reusable information consists of the names, sizes and locations of the objects.

If the process target is the first page (S203: Yes), the extracted reusable information is registered on a management list 101 (S204). FIG. 13 shows an example of the management list 101. The reuse count for the reusable information registered at this time is initialized by setting it to 1. After the reusable information is registered to the management list 101, the program returns to the step S201 for processing the next page.

On the other hand, if the processing target is the second page or later (S203: No), a judgment is made as to whether at least an item of the extracted reusable information matches with an item already registered in the management list 101 (S205). The judgment whether the two items match is made by judging if the name, size and location of the objects of both items match completely.

If at least one item of the extracted reusable information matches with the one already registered in the management list 101 (S205: Yes), the reuse count corresponding to the matched reusable information is incremented by 1 (S206). If nothing from the extracted reusable information matches with the items already registered on the management list 101 (S205: No), the program simply advances to the step S207.

In the step S207, a judgment is made as to whether all pages have been processed. If any page is unprocessed (S207: No), the program returns to the step S201 for processing the next page.

If all pages have been processed (S207: Yes), the reusable information whose reuse count matches with the total number of pages contained in the print job is extracted from the management list 101 (see FIG. 13) in order to prepare form information 102 (S208). FIG. 14 shows an example of the form information 102.

Next, returning to the flowchart shown in FIG. 8, the image processing unit 213 synthesizes the reusable data referring to the form information 102 and prepares the form data in the step S108.

Figures 15, 16:
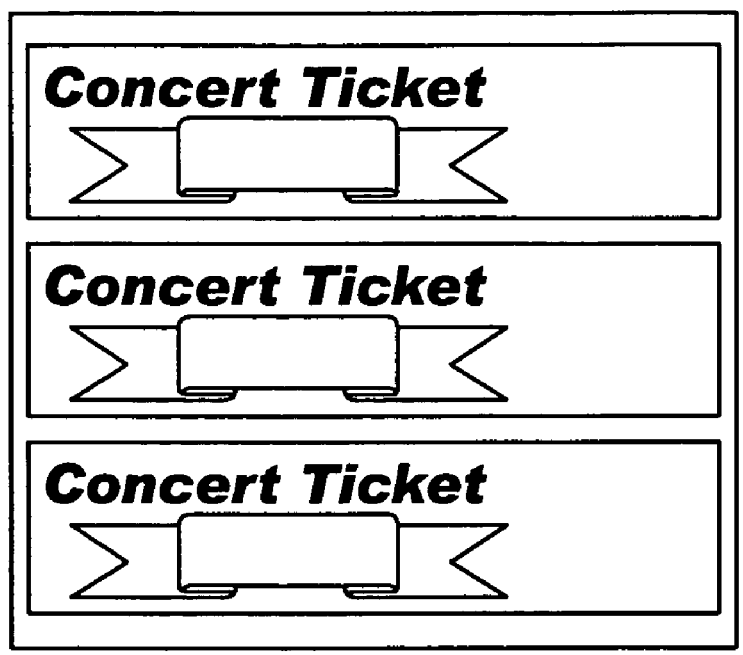
FIG. 15 shows an example of form data output.
FIG. 16 shows an example of non-reusable data output.

FIG. 15 shows an example of the form data output. The prepared form data is stored in the form data storage part 231 of the RAM 23 (S109).

In the step S110, the page data to be used in printing is prepared using the form data to be outputted to the printer 3A. First, one page portion of the layout information is read from the layout file. The image processing unit 213 refers to one page portion of the layout information, and prepares one page portion of the page data by synthesizing the form data, the reusable data and the non-reusable data. One page portion of the prepared page data is then outputted to the printer 3A.

The non-reusable data is prepared by applying the RIP and color matching processes to the non-reusable object extracted from the data file. FIG. 16 shows an example of non-reusable data output. The generated non-reusable data is stored in the non-reusable data storage part 233 of the RAM 23. The non-reusable data is deleted immediately after the use.

The process of this step is repeated until all the output of the page data for all the pages is completed. FIG. 17 shows an example of the page data outputs.

The page data outputted from the print server 2A is received by the printer 3A, and the printer 3A prints the received page data on the recording medium such as paper.

The print server of this embodiment extracts the reusable data of each object to be used on multiple pages within the file and prepares the form data by synthesizing the extracted reusable data. The print server prepares page data to be used for printing by synthesizing the prepared form data and the data per each object that is not contained in the particular form data.

Therefore, it is possible to reduce the number of synthesizing processes which have hitherto been repeated on each page even in case of common data which is used on multiple pages. This makes it possible to improve the performance of a printing process as it can reduce the time necessary for data synthesis required for page data preparation. In particular, it provides a remarkable effect in processing color image data with a large data quantity.

Next, an image processing system according to the second embodiment of the invention will be described below. Since the hardware constitution is identical to that of the image processing system of the first embodiment, the description is omitted. The following description of the image processing system according to the second embodiment therefore focuses on those points which are different from the first embodiment.

In the first embodiment, the print server extracts the reusable data of each object to be used commonly on all pages within the print job and prepares the form data by synthesizing the extracted reusable data. On the other hand, in the second embodiment, the print server extracts the reusable data of each object to be used on at least a certain percentage of all the pages within the print job and prepares the form data by synthesizing the extracted reusable data. Also, the pages are divided into a plurality of groups depending on the similarity and form data is prepared for each group. As can be seen from the above, the preparation process of the form information indicating the necessary object for preparing the form data is a difference between the first embodiment and the second embodiment.

Figure 18:
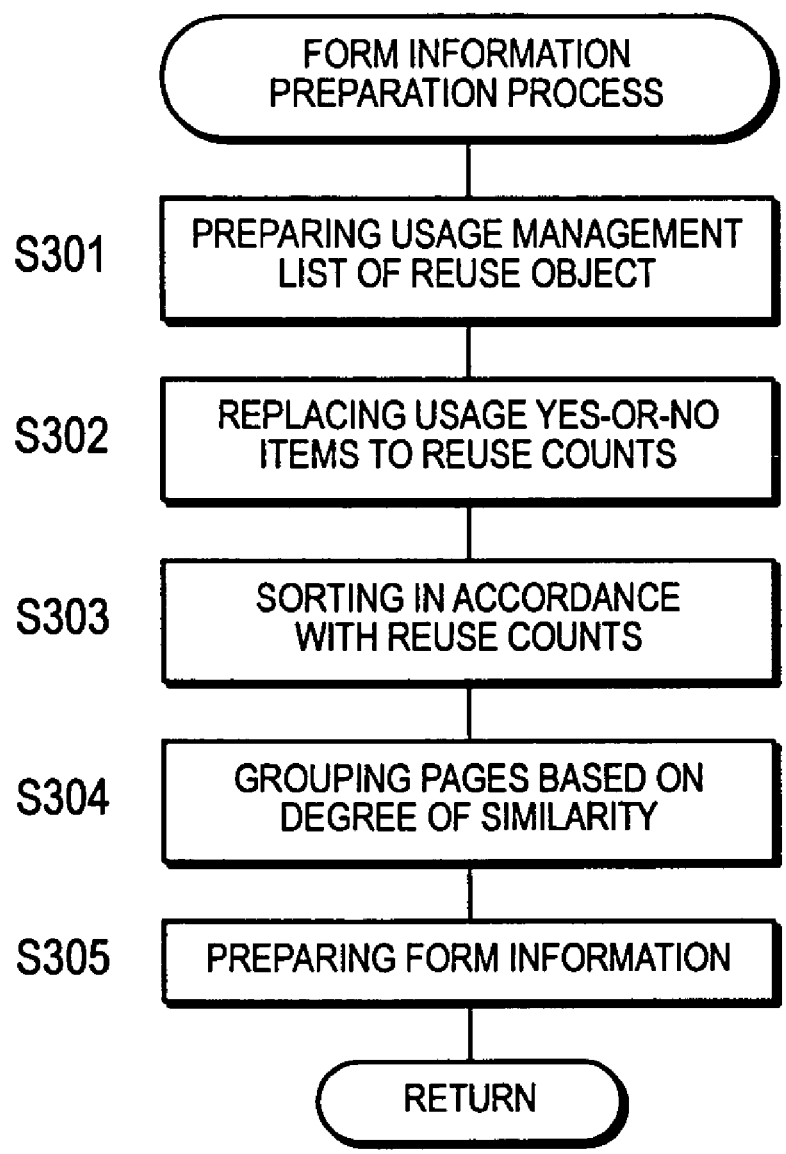
FIG. 18 is a flowchart showing the sequence of the preparation process for form information according to a second embodiment.

The preparation procedure for the form information concerning the second embodiment will be described referring to FIG. 18 through FIG. 25. The algorithm shown in the flowchart of FIG. 18 is stored as a program in a storage unit such as the ROM 22 of print server 2A and executed by the CPU 21.

The layout file contained in the print job is analyzed and a usage management list 103 is prepared for the reusable objects (S301).

FIG. 19 shows an example of the usage management list 103 of reusable objects. The usage management list 103 of the reusable objects indicates which of the reusable objects are used (indicated by o for yes or x for no) as well as the reuse count of each object. If either the name, size or position of a reusable object is different from that of another object, those objects are treated as two different objects. In other words, the reusable objects are classified as reusable 1, reusable 2, ... in FIG. 19. It shows that this example print job indicated in FIG. 19 consists of 100 pages.

Next, the yes-or-no item of reuse for each reusable object in the usage management list 103 is replaced with the reuse count. FIG. 20 shows an example of the usage management list 104 after the items have been replaced. This process has the meaning of weighting the items so that the grouping process to be discussed later can be done easily.

The usage management list 104 after the replacement is further sorted in accordance with the reuse count (S303). FIG. 21 shows an example of the usage management list 105 after the sorting. Since this process is done for the purpose of convenience, it can be omitted.

Next, each page is classified into a plurality of groups depending on the degree of similarity (S304). In other words, each page is grouped in such a way that pages of higher similarity are grouped together by comparing the pages of the usage management list 105 after the sorting. The number of calculations can be reduced by comparing only those top-ranking objects with higher reuse counts. The details of the grouping of the pages will be described later.

FIG. 22 shows an example of a group list 106 showing multiple groups classified by the similarity. According to the example shown in FIG. 22, each page is divided into a group A and a group B.

A plurality of pieces of form information is prepared based on the group list 106 (S305).

Figure 23:
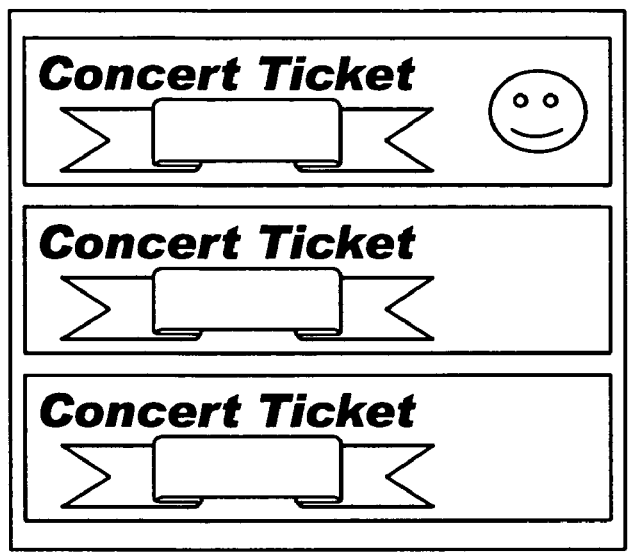
FIG. 23 shows an example output of form data based on form information A1.
Figure 24:
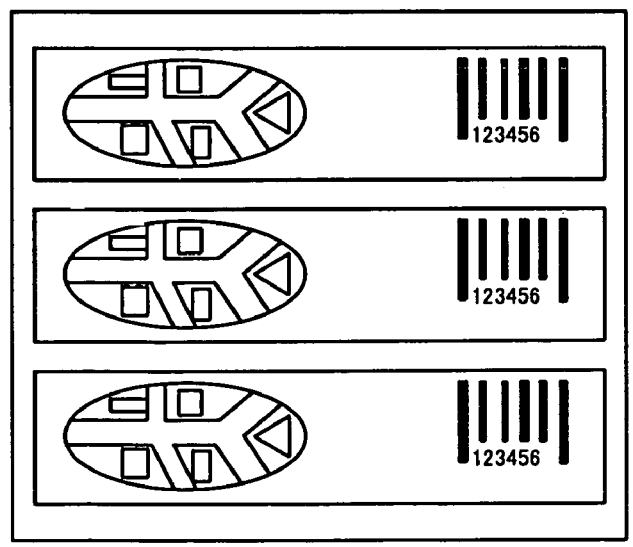
FIG. 24 shows an example output of form data based on form information B1.
Figure 25:
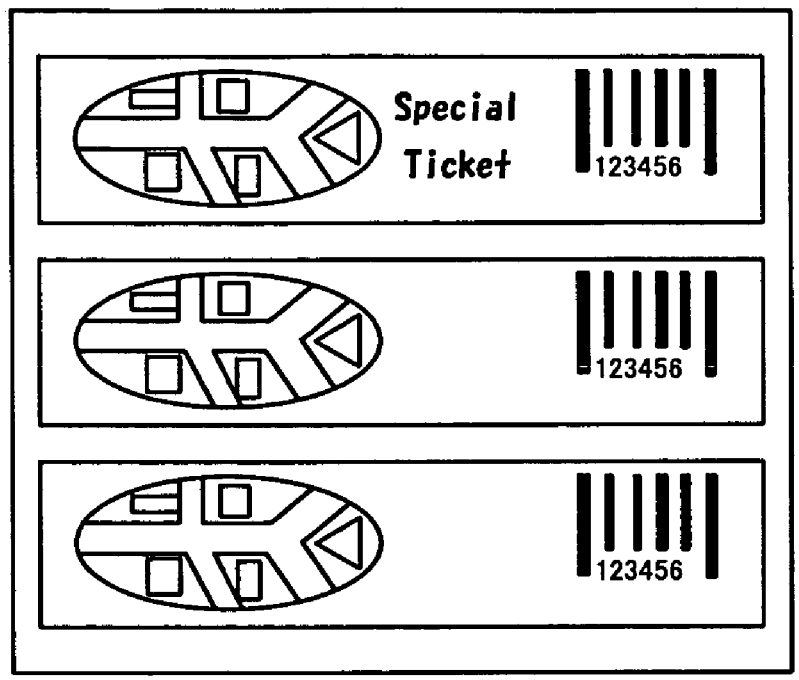
FIG. 25 shows an example output of form data based on form information B2.

For example, in accordance with the group A, form information A1 is prepared to indicate each reuse object of the reuses 2, 4, 3 and 1 as the object required for preparing the form data. FIG. 23 shows an example output of the form data prepared by synthesizing the reuse data with reference to such form information A1. The form data shown in FIG. 23 is of top page forms of concert tickets. Also, in accordance with the group B, form information B1 is prepared to indicate each reuse object of the reuses 5, 8, and 6 as the object required for preparing the form data. FIG. 24 shows an example output of the form data prepared by synthesizing the reuse data with reference to such form information B1. The form data shown in FIG. 24 is of back page forms of concert tickets. Also, in accordance with the group B, form information B2 can be prepared as a supplemental means to indicate each reuse object of the reuses 5, 8, 6 and 66 as the object required for preparing the form data. FIG. 25 shows an example output of the form data prepared by synthesizing the reuse data with reference to such form information B2. Incidentally, a judgment can be made in preparing the page data which form data based on which form information should be used for each page based on the group list 106 shown in FIG. 22.

The selection of the reuse objects to be shown in the form information prepared based on the group list 106 can be arbitrarily changed. For example, objects with higher reuse counts can be selected preferentially. In case of the group list 106 shown in FIG. 22, the form information A1 can be prepared to show each reuse object of the reuses 2 and 4 in accordance with the group A, and the form information A2 can be prepared as a supplemental means to show each reuse object of the reuses 2, 4, and 3 in accordance with the group A. Also, the form information B1 can be prepared to show each reuse object of the reuses 5 and 8 in accordance with the group B, the form information B2 can be prepared as a supplemental means to show each reuse object of the reuses 5, 8 and 66 in accordance with the group B, the form information B3 can be prepared as a supplemental means to show each reuse object of the reuses 5, 8 and 6 in accordance with the group B.

Next, the grouping method for each page will be described using an example.

As a preamble in this example, the top six reuse objects in terms of higher reuse counts in the usage management list 105 shown in FIG. 21 are considered as the targets of grouping.

(1) First, it is necessary to determine the threshold value of the similarity. In this example, the degree of similarity for a several pages in sequence (e.g., the second page through the fourth page) is calculated using the first page as the datum:

SIM (page 1, page 2)=50*0+50*0+0*50+0*50+0*0+15*0=0.

SIM (page 1, page 3)=50*50+50*50+0*0+0*0+0*0+15*15=5225.

SIM (page 1, page 4)=50*0+50*0+0*50+0*50+0*0+15*0=0.

For example, 70% of the maximum value of the result of the above calculation is used as the threshold value of the similarity. In other words, threshold value of similarity=5225*0.7=3657.

The degree of similarity can be calculated using a different method.

(2) Each page is then grouped in accordance with the degree of similarity.

(a) Grouping of the first page

Since there is no object to be compared with, the first page is considered to belong to the group A. The group A is defined as follows:

Group A=[50, 50, 0, 0, 0, 15].

(b) Grouping of the second page

First, the second page is compared with the group A as follows:

SIM (page 2, group A)=0*50+0*50+50*0+50*0+0*0+0*15=0<3657.

Since the degree of similarity is below the threshold and there is no group to be compared with, the second group is considered to belong to the group B. The group B is defined as follows:

Group B=[0, 0, 50, 50, 0, 0].

(c) Grouping of the third page

First, the third page is compared with the group A as follows:

SIM (page 3, group A)=50*50+50*50+0*0+0*0+0*0+15*15=5225>3657.

Since the degree of similarity exceeds the threshold value, the third page is considered to belong to the group A.

Since the third page has joined the group A, the coefficient that defines the group A is amended as follows:

Group A=[(50+50)/2, (50+50)/2, (0+0)/2, (0+0)/2, (0+0)/2, (15+15)/2]=[50, 50, 0, 0, 0, 15].

(d) Grouping of the fourth page

First, the fourth page is compared with the group A as follows:

SIM (page 4, group A)=0*50+0*50+50*0+50*0+0*0+0*15=0<3657.

Since the degree of similarity is below the threshold value, the fourth page is compared with the group B as follows:

SIM (page 4, group B)=0*0+0*0+50*50+50*50+0*0+0*0=5000>3657.

Since the degree of similarity exceeds the threshold value, the fourth page is considered to belong to the group B.

Since the fourth page has joined the group B, the coefficient that defines the group B is amended as follows:

Group B=[(0+0)/2, (0+0)/2, (50+50)/2, (50+50)/2, (0+0)/2, (0+0)/2]=[0, 0, 50, 50, 0, 0].

Grouping of the fifth page through the 99th page is done similarly, the description is omitted.

(e) Grouping of the 100th page

First, the 100th page is compared with the group A as follows:

SIM (page 100, group A)=0*50+0*50+50*0+50*0+30*0+0*15=0<3657.

Since the degree of similarity is below the threshold value, the 100th page is compared with the group B as follows:

SIM (page 100, group B)=0*0+0*0+50*50+50*50+0*30+0*0=5000>3657.

Since the degree of similarity exceeds the threshold value, the 100th page is considered to belong to the group B. Since the 100th page has joined the group B, the coefficient that defines the group B is amended.

In the above description, the singled pass clustering method, which is a non-hierarchical clustering technique, is used as the grouping method according to the degree of similarity. However, other methods such as the k-mean method can be used as well.

Thus, in the second embodiment, the print server extracts the reusable data of each object to be used on a certain percentage of all the pages within the print job and prepares the form data by synthesizing the extracted reusable data.

Therefore, the second embodiment not only provides a similar effect as the first embodiment but also provides the form data that can be used on a certain number of pages, if not on all the pages, within the print job. This makes it possible to reduce the time necessary for data synthesis required for page data preparation more efficiently.

It is obvious that this invention is not limited to the particular embodiments shown and described above but may be variously changed and modified without departing from the technical concept of this invention.

For example, the group list 106 and the form data shown in FIG. 23 through FIG. 25 prepared in the second embodiment can be preserved for a specified period in the hard disk 24 or an external device such as a database server. In this case, the preserved form data can be reused when it is reprinted based on the same print job or when the print job is divided into several sections and printing is attempted based on the remaining job after a portion of the job is completed. This promotes effective use of the preserved form data and can contribute to an improvement of the overall printing process performance.

It can also be constituted in such a way that a plurality of form data prepared in the second embodiment as shown in FIG. 23 through FIG. 25 is assigned respectively to another plurality of print servers connected via the network 5 and that page data is prepared and outputted using the form data assigned to each print server. In this case, one of the plurality of print servers becomes the master server and others become slave servers. The master server, for example, can perform analysis of the layout file, RIP, and distributed transmissions of reusable data and non-reusable data to the slave servers. The slave servers can, for example, be in charge of preparation and preservation of the form data, formation of page data, and control of the printer. This makes it possible to realize a faster printing process.

It is also possible to use, in place of a printer, another image forming device such as a facsimile machine, a copying machine, or an MFP (multi-function peripheral) that has a combination of their functions.

The means and method of conducting various processes in the image processing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the device as a part of its function.

What is claimed is:

1. An image processing device for processing a file containing objects that define a part or all of contents of a specific page, at least one of which objects being used in a plurality of locations of the file, said device comprising:
   an extraction unit for extracting data for reusable objects, wherein the reusable objects are used commonly in a plurality of pages in the file;
   a raster image generating unit for rasterizing two or more of the extracted reusable objects;
   a form data preparation unit for preparing form data by synthesizing data corresponding to the two or more rasterized reusable objects;
   a form data storage unit for storing the prepared form data, and
   a page data preparation unit for preparing page data to be used for printing by synthesizing the form data that was prepared by synthesizing data corresponding to the two or more rasterized reusable objects and stored in the form data storage unit and data for each object that is not contained in the form data.

2. The image processing device as claimed in claim 1, wherein
   said file containing objects that define a part or all of contents of a specific page, at least one of which objects being used in a plurality of locations of the file, is a PDF (Portable Document Format) file.

3. The image processing device as claimed in claim 1, wherein
   said extraction unit extracts data for each object that is used commonly on all the pages in the file.

4. The image processing device as claimed in claim 1, wherein
   said extraction unit extracts data for each object that is used commonly on at least a certain percentage of all pages in the file.

5. The image processing device as claimed in claim 4, wherein
   said form data preparation unit prepares a plurality of kinds of form data.

6. An image processing method for processing a file containing objects that define a part or all of contents of a specific page, at least one of which objects being used in a plurality of locations of the file, said method comprising the steps of:
   1) extracting data for reusable objects, said reusable objects being used commonly on a plurality of pages in the file;
   2) rasterizing two or more of the reusable objects;
   3) preparing form data, using a form data preparation unit implemented on a central processing unit, by synthesizing data corresponding to the two or more rasterized reusable objects, and storing the form data in a form data storage unit;
   4) preparing page data to be used for printing by synthesizing the form data that was prepared by synthesizing data corresponding to the two or more rasterized reusable objects and stored in the form data storage unit and data of each object that is not contained in the form data; and
   5) storing the prepared page data in a page data storage unit.

7. The image processing method as claimed in claim 6, wherein
   said file containing objects that define a part or all of contents of a specific page, at least one of which objects being used in a plurality of locations of the file, is a PDF (Portable Document Format) file.

8. The image processing method as claimed in claim 6, wherein
   data for each object that is used commonly on all pages in the file is extracted in said step 1).

9. The image processing method as claimed in claim 6, wherein
   data for each object that is used commonly on at least a certain percentage of all the pages in the file is extracted in said step 1).

10. The image processing device as claimed in claim 9, wherein
    a plurality of kinds of form data is prepared in said step 2).

11. A computer readable recording medium stored with an image processing program for processing a file containing objects that define a part or all of contents of a specific page, at least one of which objects being used in a plurality of locations of the file, said program causing a computer to execute a process comprising the steps of:
    1) extracting data for reusable objects, said reusable objects being used commonly on a plurality of pages in the file;
    2) rasterizing two or more of the extracted reusable objects;
    3) preparing form data by synthesizing data corresponding to the two or more rasterized reusable objects, and storing the form data in a form data storage unit;
    4) preparing page data to be used for printing by synthesizing the form data that was prepared by synthesizing data corresponding to the two or more rasterized reusable objects and stored in the form data storage unit and the data of each object that is not contained in the form data; and
    5) storing the prepared page data in a page data storage unit.

12. The computer readable recording medium as claimed in claim 11, wherein
    said file containing objects that define a part or all of contents of a specific page, at least one of which objects being used in a plurality of locations of the file, is a PDF (Portable Document Format) file.

13. The computer readable recording medium as claimed in claim 11, wherein
    data for each object that is used commonly on all pages in the file is extracted in said step 1).

14. The computer readable recording medium as claimed in claim 11, wherein
    data for each object that is used commonly on at least a certain percentage of all the pages in the file is extracted in said step 1).

15. The computer-readable recording medium as claimed in claim 14, wherein
    a plurality of kinds of form data is prepared in said step 2).

16. The image processing device as claimed in claim 1, wherein the data for each object that is not contained in the form data includes data for a non-reusable object and data for a reusable object.

17. The computer-readable recording medium as claimed in claim 14, wherein the data of each object that is not contained in the form data includes data for a non-reusable object and data for a reusable object.

18. The computer readable recording medium as claimed in claim 11, wherein the data of each object that is not contained in the form data includes data for a non-reusable object and data for a reusable object.

19. The image processing device as claimed in claim 1, wherein the prepared form data consists of reusable objects.

20. The image processing method as claimed in claim 6, wherein the prepared form data consists of reusable objects.

21. The computer readable medium as claimed in claim 11, wherein the prepared form data consists of reusable objects.

* * * * *